United States Patent [19]
Abrams

[11] Patent Number: 5,493,832
[45] Date of Patent: Feb. 27, 1996

[54] MODULAR WALL UNIT, SYSTEM AND METHOD FOR MAKING STORAGE CONTAINERS AND BARRIERS

[76] Inventor: Ned H. Abrams, 152 N. Third St., San Jose, Calif. 95113

[21] Appl. No.: 136,412

[22] Filed: Nov. 26, 1993

[51] Int. Cl.$^6$ .................................................. E04B 1/00
[52] U.S. Cl. .................. 52/264; 52/284; 52/578
[58] Field of Search .................... 52/79.4, 264, 284, 52/578, 245, 630, 239, 36.1, 36.2, 270

[56] References Cited

U.S. PATENT DOCUMENTS

| | | | |
|---|---|---|---|
| 2,746,283 | 5/1956 | Abrams | 72/6 |
| 3,289,366 | 12/1966 | Abrams | 52/174 |
| 3,444,694 | 5/1969 | Frehner | 52/578 X |
| 4,038,795 | 8/1977 | Abrams | 52/169 |
| 4,060,945 | 12/1977 | Wilson | 52/245 X |
| 4,074,495 | 2/1978 | Bodnar | 52/630 X |
| 4,881,355 | 11/1989 | Bosl et al. | 52/630 X |

FOREIGN PATENT DOCUMENTS

| | | | |
|---|---|---|---|
| 888742 | 12/1943 | France | 52/245 |
| 348809 | 10/1960 | Switzerland | 52/245 |
| 544079 | 3/1942 | United Kingdom | 52/245 |
| 544851 | 4/1942 | United Kingdom | 52/245 |

Primary Examiner—Lanna Mai
Attorney, Agent, or Firm—Claude A. S. Hamrick

[57] ABSTRACT

A modular container wall unit and containment system formed therewith, each wall unit includes a central panel having wing-like side panels integrally formed on opposite sides thereof and angularly intersecting the central panel at an angle such that, when the side panels of another modular unit are affixed to the central panel of the present unit, and one or more like units are affixed to the second and third units, a chamber is formed which, when combined with a bottom panel and a top panel, defines a container. The central panel of each unit is designed to include recessed areas adapted to mate with the side panel of another modular unit to facilitate the expansion of the system to form an adjacent cell or chamber. Furthermore, the modular unit is configured to withstand lateral loads and maintain system integrity.

10 Claims, 17 Drawing Sheets

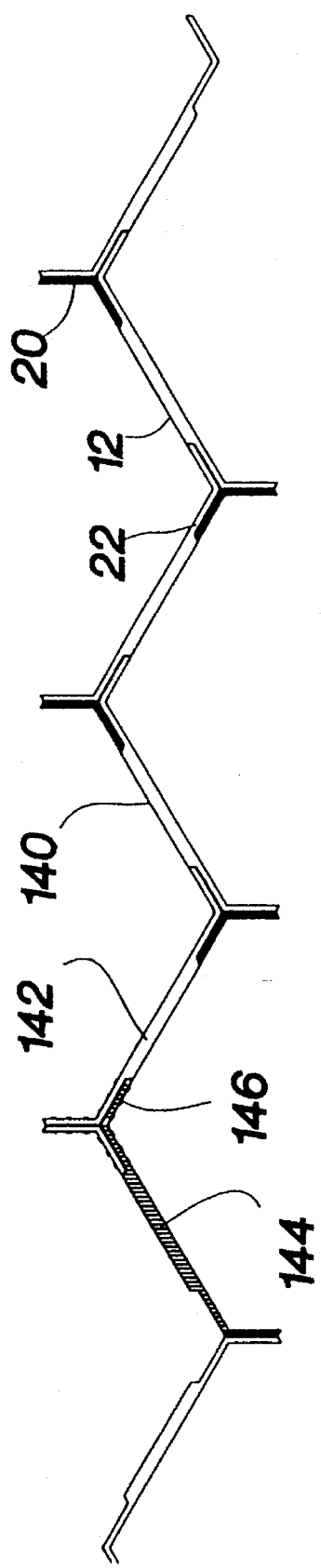

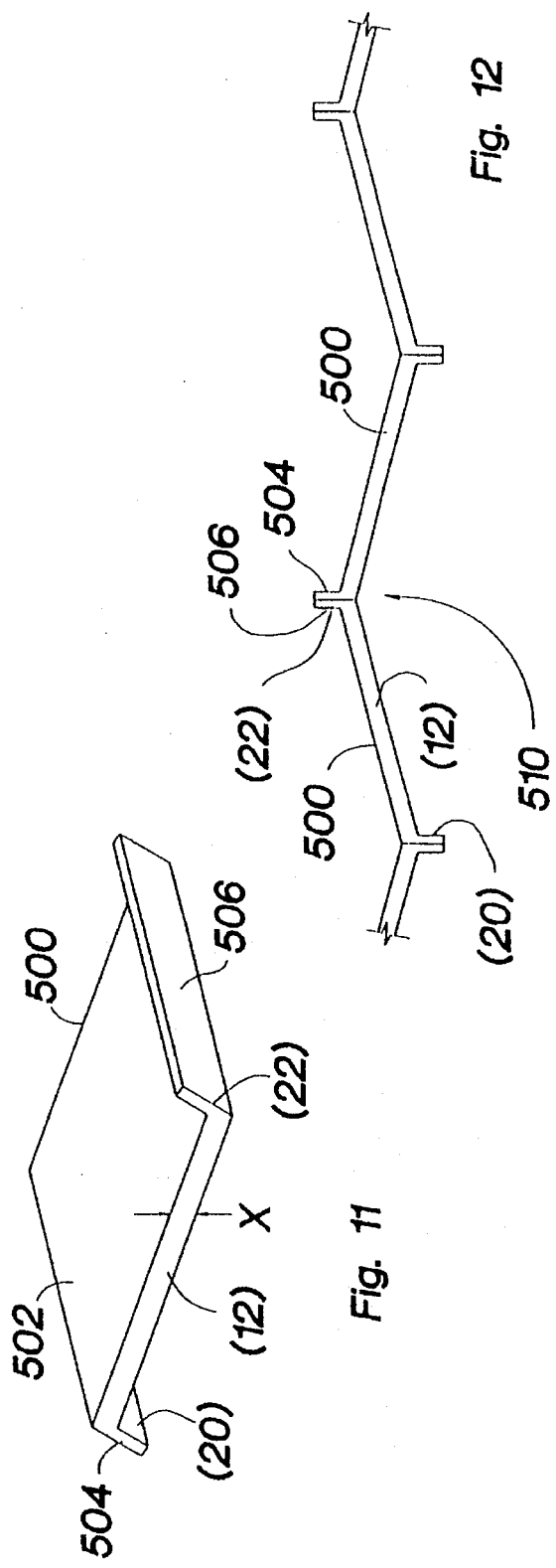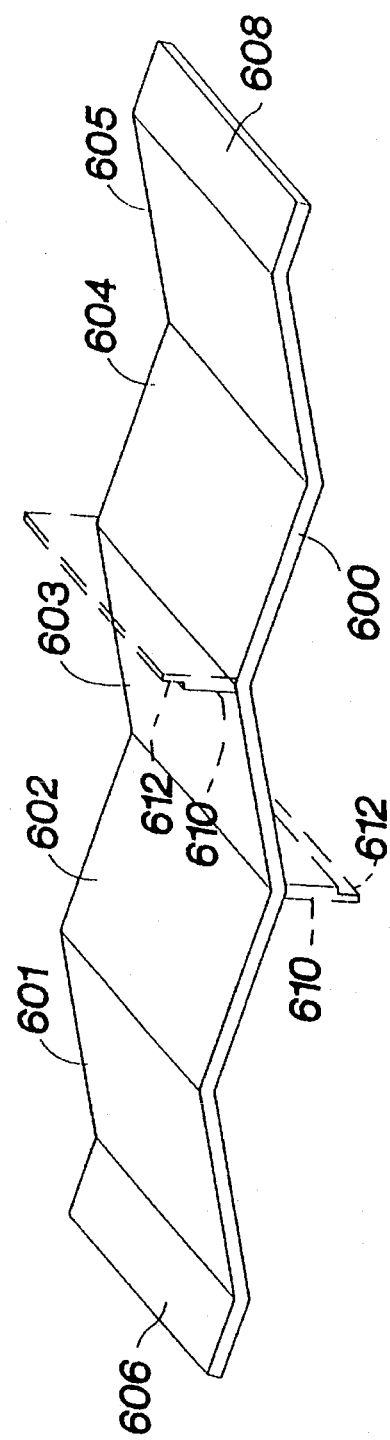

5,493,832

MODULAR WALL UNIT, SYSTEM AND METHOD FOR MAKING STORAGE CONTAINERS AND BARRIERS

BACKGROUND OF THE INVENTION

1. Field of the Invention

This invention relates generally to modular wall units which are suitable for use in the construction of tanks, containers, storage bins and the like, and more particularly, to a novel wall unit which can be combined with a plurality of like units to define, inter alia, a storage system having a single chamber or a plurality of cellular chambers that can be used for a wide variety of purposes.

2. Brief Description of the Prior Art

The adequate storage of materials, particularly materials considered hazardous, presents a number of problems. Such materials are usually stored in storage bins which are constructed to hold a specific volume. Depending on the type of material being stored, various specifications pertain to the strength and thickness of the materials being used in the construction of the storage bins. Another important consideration in the construction of bins, particularly those for hazardous waste materials, is the ability to isolate various sections of the storage bin from other similar sections. From an economic standpoint, a major consideration is that of providing optimal usage of the materials from which the storage bins are constructed as well as the full utilization and thus conservation of the land on which the bins are located.

Furthermore, the need has arisen for storage and containment systems which are expandable beyond their capacity as originally constructed. This is particularly true in the case of hazardous waste cleanup sites; for example, those at or near nuclear testing facilities. The ability to expand a materials storage or containment facility provides optimum flexibility in determining the storage capacity of the system. If a system can be easily expanded, a relatively small initial facility can be constructed and, as and when the need arises, the structure can be expanded over a period of time to accommodate additional storage requirements. This capability of expansion is particularly useful if such expansion can be done relatively cheaply and without substantial redesign and modification or adaptation of the existing structure.

Accordingly, a need exists for a materials storage or containment system which meets the above requirements and, in particular, one which can readily be enlarged to increase its storage capacity. In addition, a need exists for a modular panel which can either be precast and transported to the construction site or can be cast on site in either an upright or supine position.

SUMMARY OF THIS INVENTION

It is therefore an object of this invention to provide a single modular unit which, when combined with other like modular units, can be used to define a materials storage container.

Another object of the present invention is to provide a modular unit of the type described which, in addition to being combined with like units to form a single storage container, can additionally be combined with still other like units to provide adjacent storage containers.

Yet another object of the present invention is to provide modular units that can be combined to define a system of storage containers that can be increased in number even after construction of the initial container structure has been completed.

It is a further object of this invention to provide a storage container system which makes optimum use of materials and the land on which the containers rest.

Still another object of the present invention is to provide a modular unit which can be combined with other like units to form barriers or retaining structures of various configurations.

Briefly, a presently preferred embodiment of the present invention includes a modular wall unit comprised of a central panel having wing-like side panels integrally formed on opposite sides thereof and angularly intersecting the plane of the central panel at an angle such that, when the wings of other modular units are affixed to opposite portions of the central panel of the present unit, and one or more like units are in turn affixed to the second and third units, a structure is formed which, when combined with at least a base, defines a barrier and/or container. The central panel of each unit is designed to include recessed areas adapted to mate with the wing panel of another modular unit to facilitate the joining of the units as well as the expansion of the system to form an adjacent cell or chamber. Furthermore, the modular unit is configured to withstand lateral loads and maintain system integrity.

An important advantage of the present invention is that it provides a modular unit which can be combined with a plurality of like units to define a barrier, retainer or one or more storage containers suitable for retaining or storing a wide variety of materials.

Another advantage of the present invention is that the modular units can be affixed to each other using simple mechanical fasteners.

Still another advantage of the present invention is that the modular units can be formed using a variety of readily available materials and facilities, and do not require inordinately expensive forms or jigs to facilitate their construction.

An additional advantage of the present invention is that the modular units need not be pre-stressed nor post-tensioned, and because, once in place, there will be no creep or differential expansion relative to a concrete floor or roof structure, and the walls can be completely sealed using suitable sealing membranes and/or linings or coatings.

These and other objects and advantages of the present invention will no doubt become apparent to those skilled in the art after having read the following detailed description of the preferred embodiment which is illustrated in the several figures of the drawing.

IN THE DRAWING

FIG. 5b is a broken cross-section taken along the line 5b–5b of FIG. 5a;

FIG. 6e is a plan view illustrating another alternative use of the present invention;

FIG. 11 is a perspective view showing another alternative embodiment of the present invention particularly suited for retaining walls, roadway sound barriers, etc;

FIG. 12 is a plan view illustrating an assembly of the modular units off FIG. 11 to form a continuous wall structure or the like;

FIG. 13 illustrates still another modular unit in accordance with the present invention.

DESCRIPTION OF THE PREFERRED EMBODIMENTS

Figure 1:
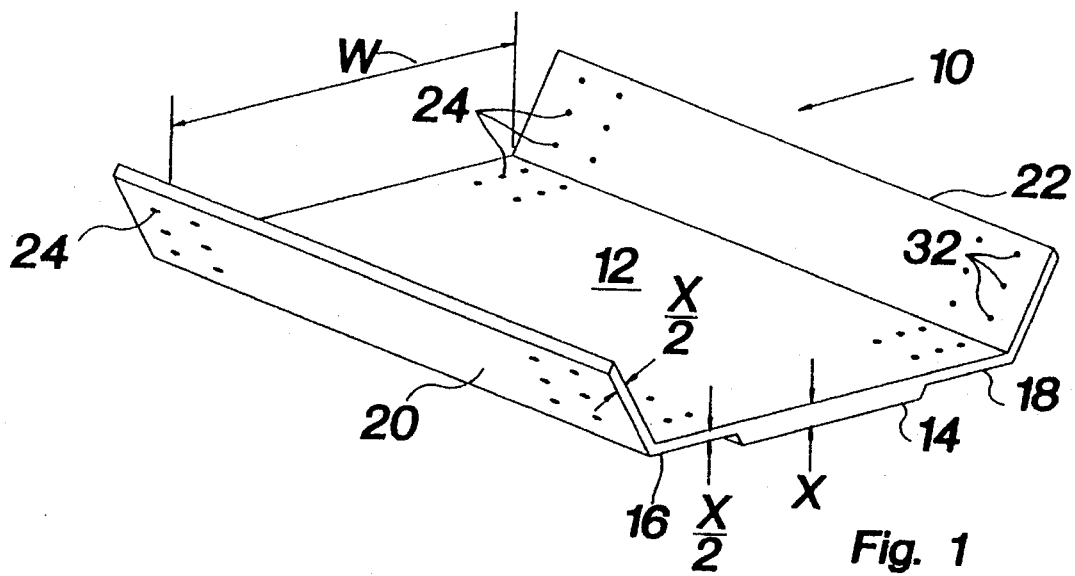
FIG. 1 is a pictorial representation of a modular unit in accordance with the present invention which is suitable for use in constructing a variety of structures including, among other things, a single or a plurality of hexagonally shaped storage containers.

In FIG. 1 of the drawing, a preferred embodiment of a modular unit in accordance with the present invention is shown at 10 lying on one side and includes a rectangular center panel 12 having a central portion 14 of a thickness X disposed between two side portions 16 and 18 of a thickness X/2. The thickness X is application dependent. Formed integral with the center panel 12 and on each side thereof are a pair of elongated rectangular planar wings or side panels 20 and 22 lying in planes which intersect the plane of center panel 12 at included angles of 120°. The thickness of side panels 20 and 22 is substantially X/2 for reasons which will be explained below. As depicted in the drawing, bolt-receiving bores 24 are provided at opposite extremities of the side portions 16 and 18 and the side panels 20 and 22. Additional bolt holes may also be provided along the lengths of side portions 16 and 18, and side panels 20 and 22.

In the preferred embodiment the unit 10 is a preformed reinforced concrete structure of any suitable height and width. In one embodiment the length L is 16 feet, the width W of the center panel is approximately 10 feet, the width of center portion 14 is W/2 or larger, and the width of the side portions 16 and 18 and the wings 20 and 22 is W/4 or less. The overall width of the modular unit is 14 feet or less so that it can be trucked over the highways.

The modular unit 10 may be precast and trucked to the construction site, be formed on the job site in either supine or in-place upright position, or may be extruded and cut to length. Although the preferred embodiment is made of steel-reinforced concrete, the units could be made of any suitable materials. For example, where used to build smaller containers, the units may be made of plastics, fiberglass, fiberboard, or other composite materials.

Figure 2:
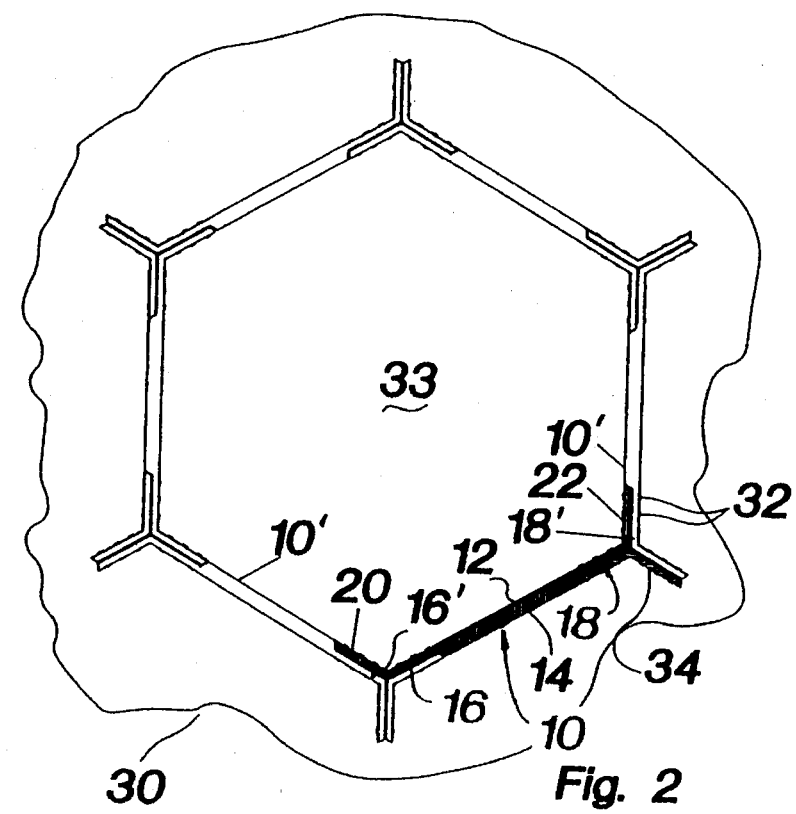
FIG. 2 is a plan view of a single hexagonally shaped container conducted using a plurality of the modular units depicted in FIG. 1.

Turning to FIG. 2 of the drawing, a plan view is depicted showing six of the panels 10 standing on end on a concrete base or floor 30 with alternating panels facing in opposite directions, such that the wings 20, 22 of one panel mate with the side portions 18 and 16 respectively of an adjacent unit. The several panels are secured together by means of bolts 32 which pass through the bores or holes 24 mentioned with respect to FIG. 1. As is apparent, the connection of the six units 10 in the manner depicted forms a hexagonally configured cell, chamber or container 33 which can be used for a variety of purposes.

Also depicted in FIG. 2 is a filler unit 34 which mates with a side portion of one panel and a wing portion of the adjacent panel to fill in and provide a uniform wall thickness for the single cell structure. Such a panel would be positioned at each of the panel interconnections. However, as will be described hereinbelow, the units 34 will be replaced by portions of adjacent cell-forming units as the storage capacity of the system is expanded.

Figure 3:
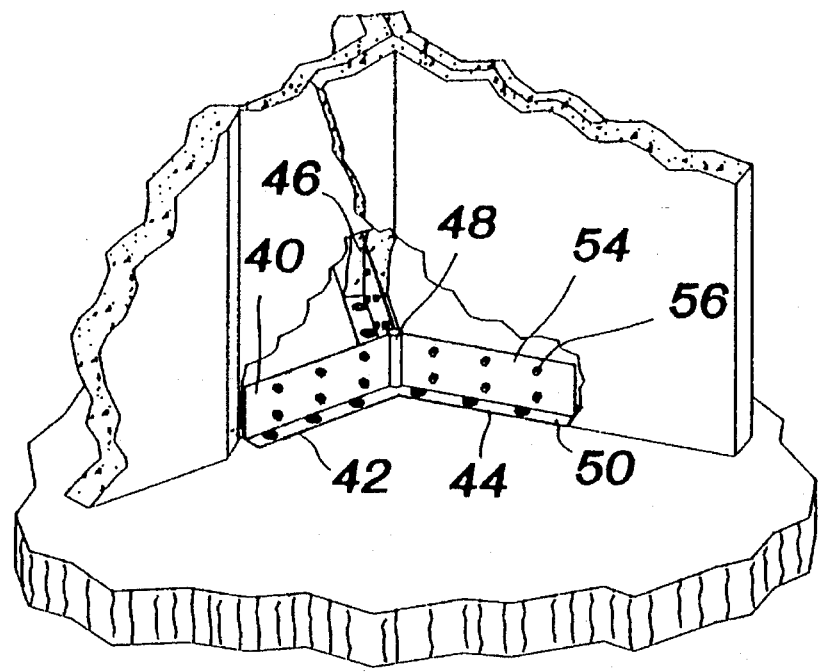
FIG. 3 is a partially broken pictorial illustration showing a three-way connecting fastener used to connect and tie down the bottoms and/or tops of two or more panels to form the structure depicted in FIG. 2.
Figure 4:
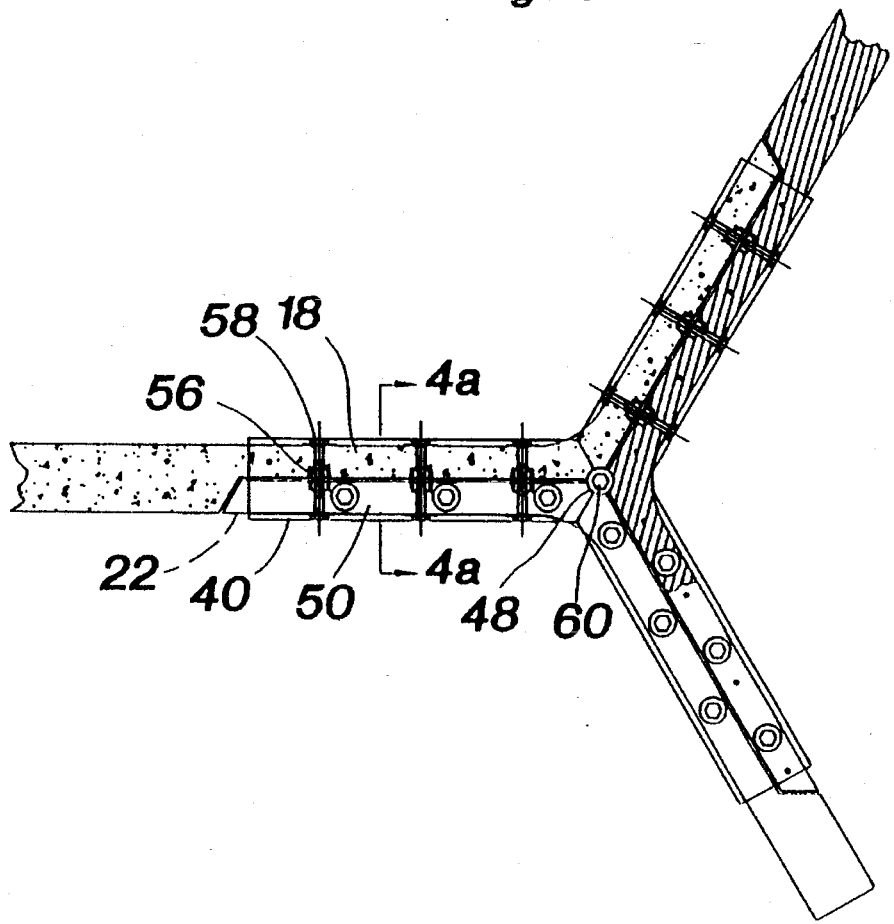
FIG. 4 is an exploded plan view showing a single junction of two or three modular units to illustrate the manner in which they are attached to each other and to the fastener illustrated in FIG. 3.
Figure 4A:
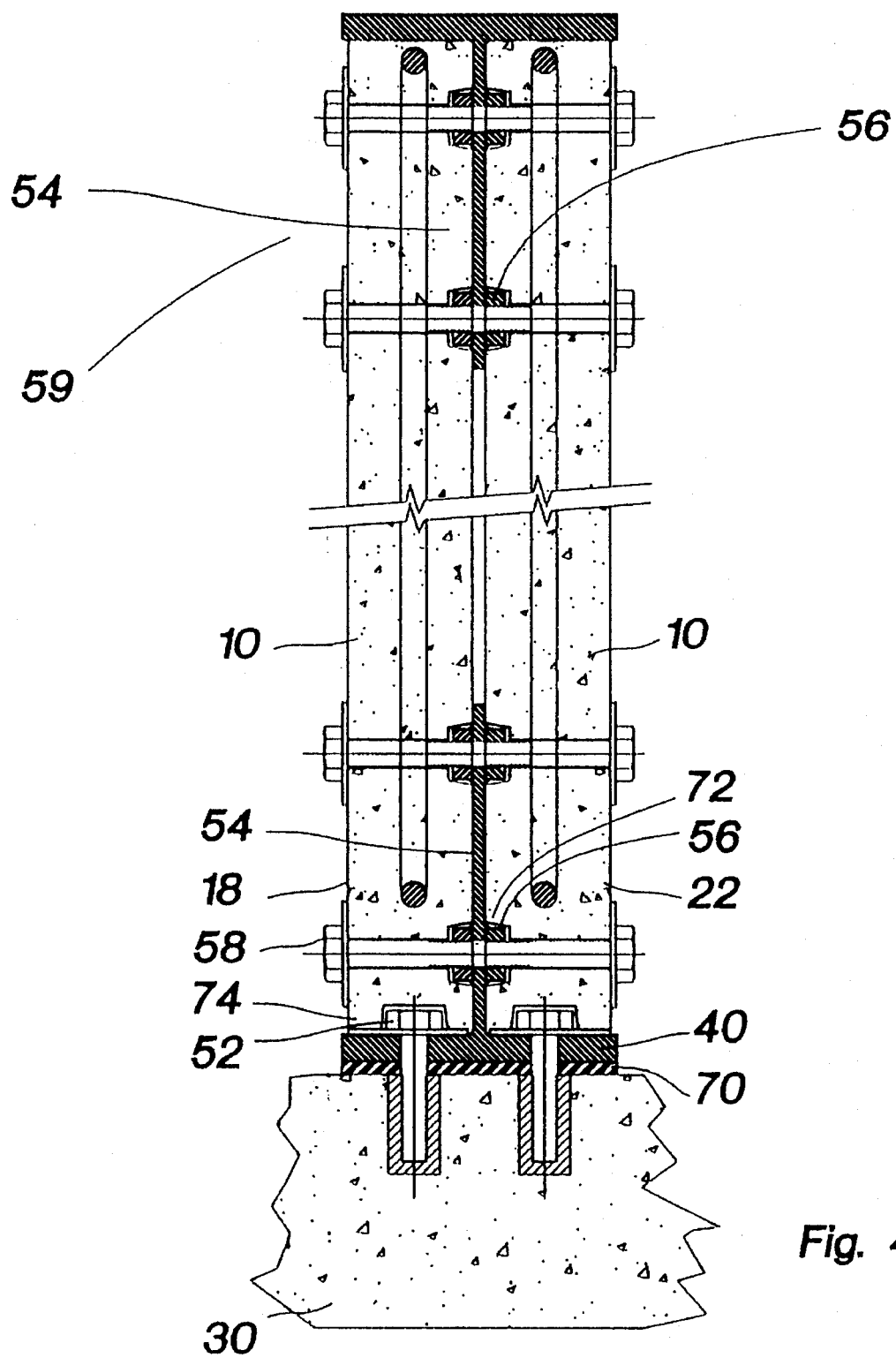
FIG. 4a is a cross-section taken along the line 4a–4a in FIG. 4 and further illustrating the fastener of FIG. 3.

Referring to FIGS. 3, 4 and 4a, details of one form of a base fastener will be described. As shown in FIGS. 3 and 4, the fastener 40 is comprised of three intersecting steel T-sections 42, 44 and 46 intersecting each other at 120° angles and joined together about a central tube 48. The horizontal bases 50 are provided with openings through which bolts 52 may be passed to secure the fasteners to the floor forming base slab 30. The upstanding webs 54 have threaded nuts or sockets 56 welded to each face thereof for receiving panel- securing bolts 58 as depicted in FIG. 4. The tube 48 disposed at the apex of the three legs of fastened 44 provides a means for accurately positioning the fastener at an accurately located panel junction position carefully laid out in the floor slab 30. Preferably, a suitable threaded socket or a threaded and upstanding bolt is positioned at such location. In the former case, a bolt would be extended through the bore in tube 38 to engage the slab-mounted socket. In the alternative, the upstanding bolt would be passed through the bore in tube 48 and be secured thereto by a nut 60, as illustrated in FIG. 4.

FIG. 4a is a section taken along the line 4a–4a of FIG. 4 and more clearly illustrates the manner in which the fasteners 40 are secured to the slab 30 and have the units 10 affixed thereto. Note that in some embodiments it may be desirable to position a plastic or rubber seal 70 beneath the fastener 40 as well as the units 10 to make the assembly fluid-tight.

Note also that, in order to accommodate the fastening nuts 56 and the heads of bolts 52, slots or counterbores 72 and 74 respectively, may be provided in each of the units 10. The upstanding web 54 of fastener 40 may also be extended upwardly to accommodate additional bolts. It will of course be appreciated that by using the indicated short bolts 58 passing through a single panel, instead of long bolts passing through both panels, the bolting operation can be completed by one person without requiring an assistant on the other side. A similar fastener and bolting configuration will be used at the top of the units as depicted at 59.

Figure 5:
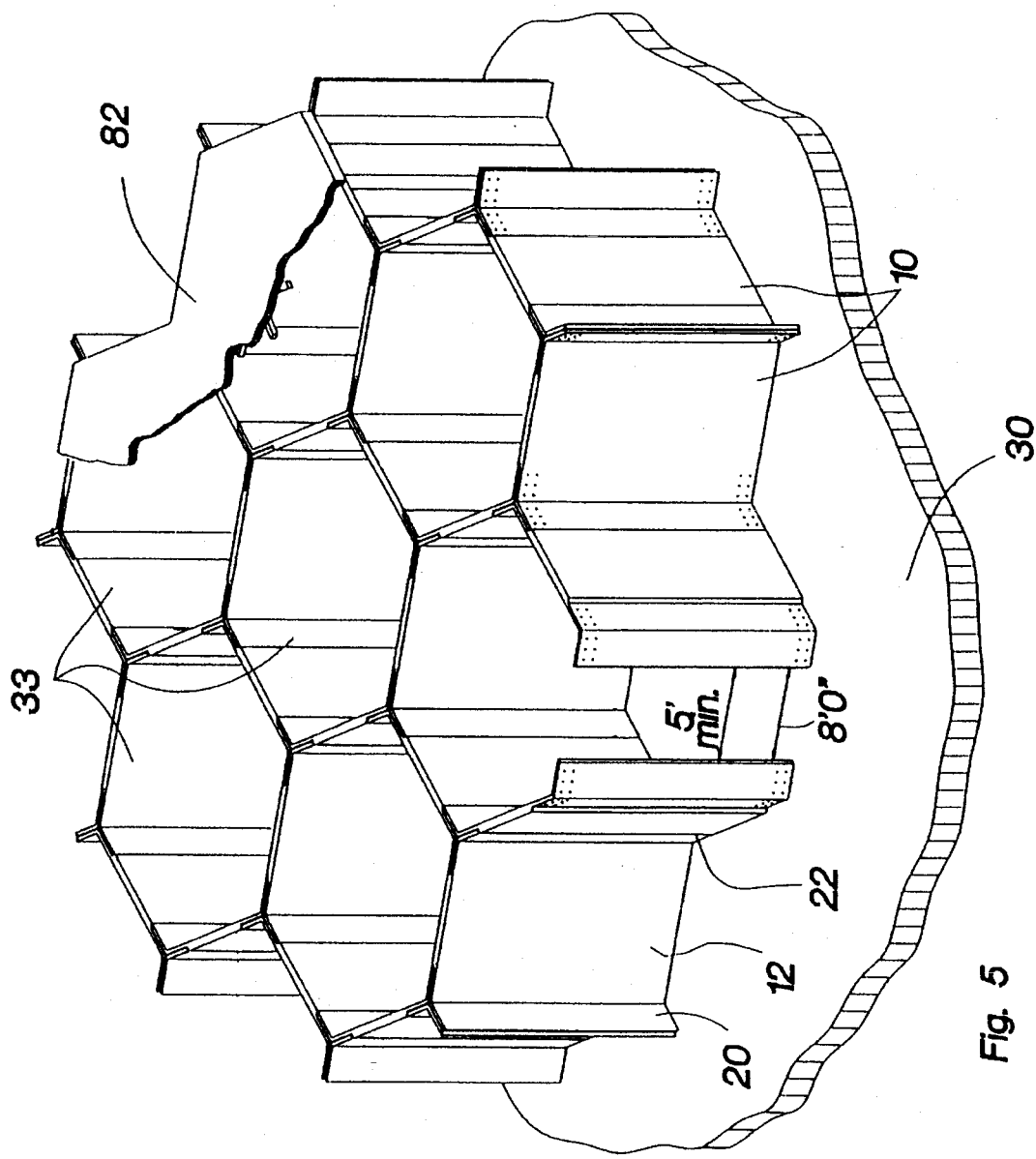
FIG. 5 is an illustration depicting a plurality of contiguously formed containers of the type illustrated in FIG. 1.

In FIG. 5 a plurality of the wall units 10 are shown upright, in place and interconnected to provide a multi-celled container structure. In the illustrated example, such a structure might be formed using modular units which are 16 feet high and have a wing-edge-to-wing-edge width of 14 feet to accommodate truck transport. An interesting feature of the present invention is that, as each cell 33 is fabricated, one wall unit can be left out of place to form an opening 80 through which a forklift or other loading means can pass to stack drums or other material to be stored within the storage cell. The last panel can thereafter be placed in position and affixed to its adjoining panels as previously described.

Note that one or more of the modular units 10 may be apertured or be made shorter in length to provide a communicating passageway between the adjacent cells. For example, the illustrated structure might be used to form a cascading filtration assembly. In such case the height of several adjoining walls might be lowered so that fluid spilled from one chamber to another.

Following assembly of each cell, or alternatively, several of the cells, a roof structure, such as depicted at 82, can be fabricated to form a closure for the several chambers if appropriate.

Figure 5A:
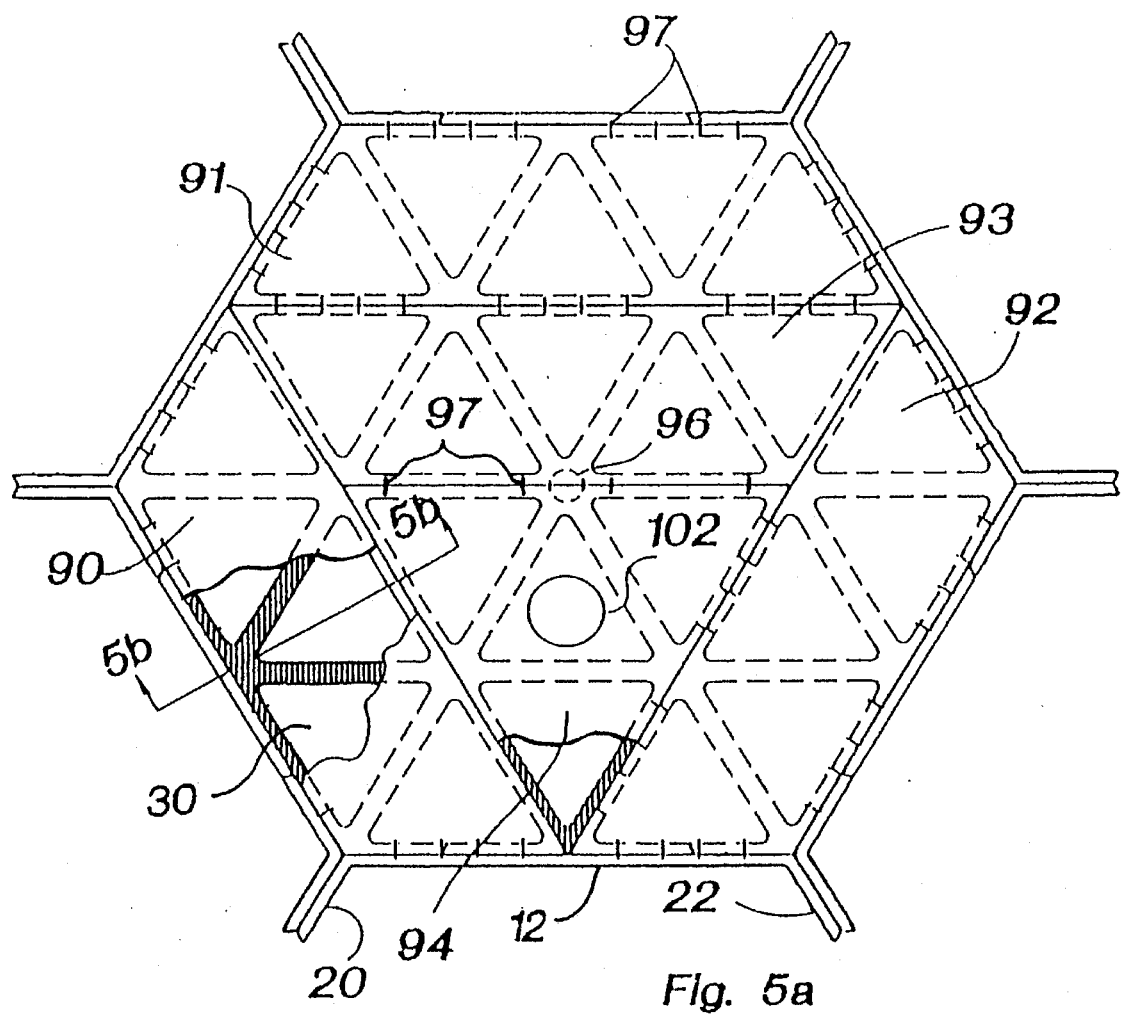
FIG. 5a is a plan view illustrating one way in which precast removable roof panels may be configured and installed to cover a single container cell.
Figure 5B:
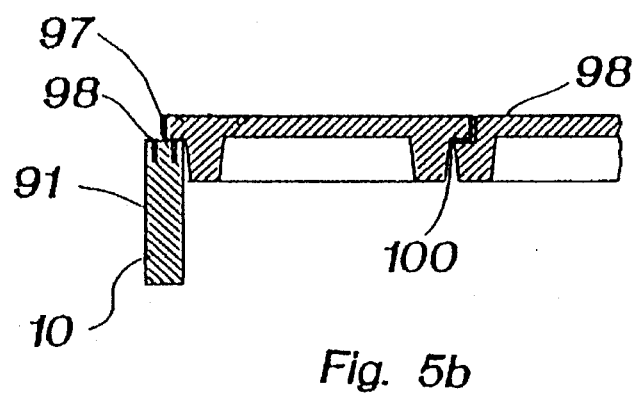

In FIGS. 5a and 5b one possible form of roofing assembly is depicted in which four identical trapezoidally configured panels 90, 91, 92 and 93, and one triangularly configured panel 94 are precast, lifted and set in place above the structure to rest upon the wall units. In some instances it may also be desirable to provide a supporting center column 96. In the illustrated embodiment it will be appreciated that, as shown in FIG. 5b, the precast units are cast in an internally reinforced slab-and-rib, or waffle, configuration and include shoulders and overhanging edges for engaging and resting upon the upper extremities of wall units 10 and the shoulders 100 of adjacent panels. It should readily be apparent that, where such modular roof-forming elements are used, a crane or other lifting device can be used to install the roof, and subsequently remove same should the need arise.

Alternatively, it may also be appropriate to hinge at least some of the panels, as suggested at 97, so that they may be rotated into an upstanding position to allow chamber access. Since each of the roofing units is essentially self-supporting, or is supported by an adjacent unit, it will be appreciated that any or all of such roofing units could also be provided with a manhole or other type of access port, as suggested at 102 in FIG. 5a.

Figure 6:
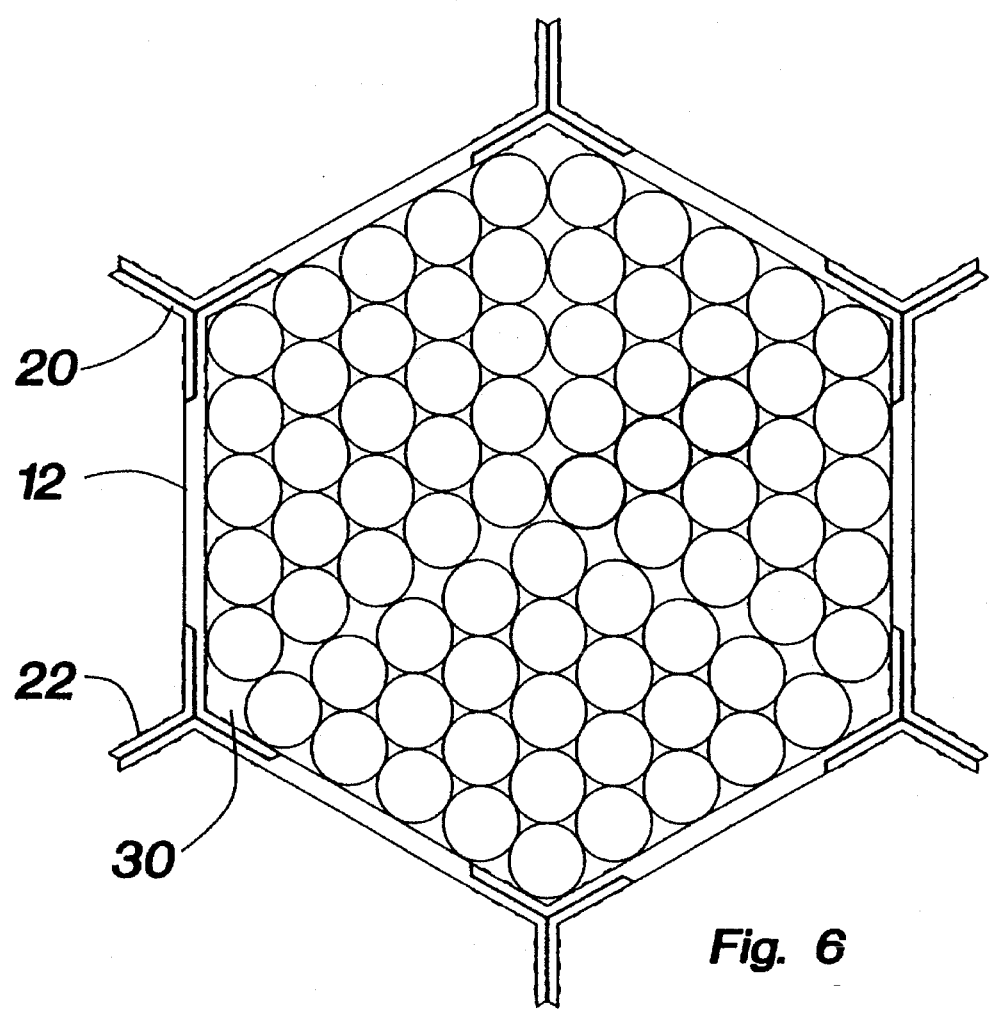
FIG. 6 is a plan view illustrating how the container of the present invention can be used to store a plurality of standard barrels.

With regard to utility of the present invention for use as a secondary containment for hazardous waste drums, an example is given in FIG. 6 showing how more than 70 standard size drums can be positioned on the floor of the chamber, and additional drums could then be stacked several layers high. Obviously, the number of drums that can be accommodated will be dependent on the type and size of the drums, the access requirements, the type of material being stored, etc.

Figure 6A:
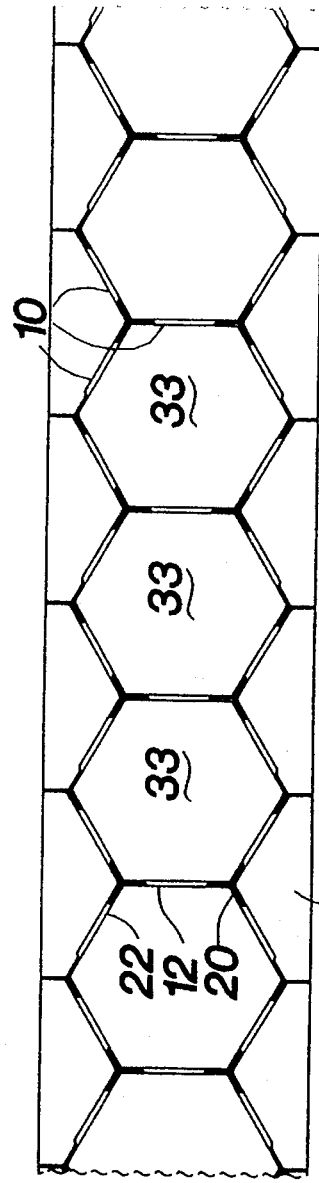
FIGS. 6a–6d are plan views illustrating various ways in which the modular units may be combined to form elongated rectangular structures.
Figure 6B:
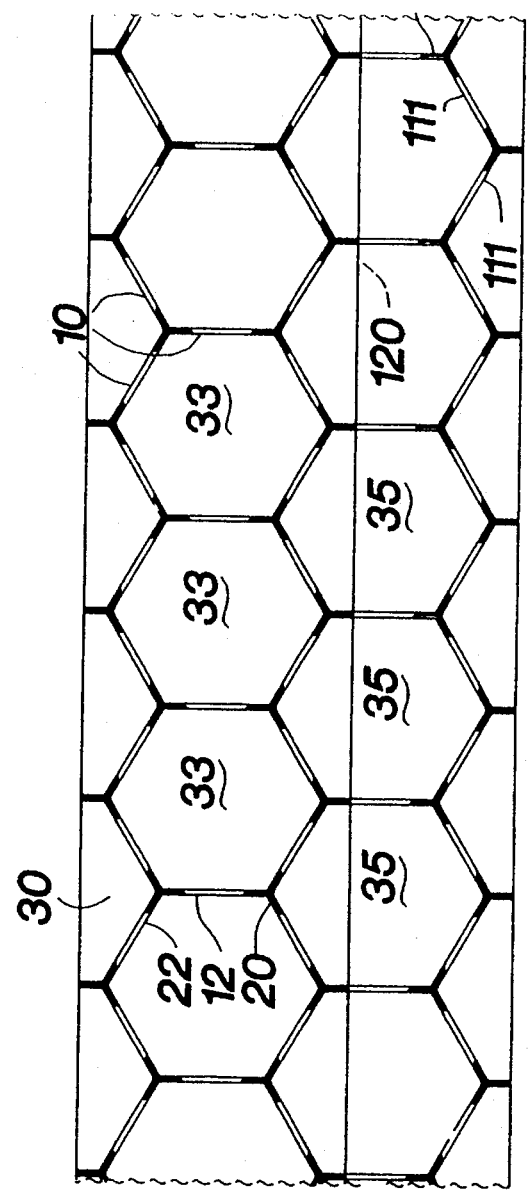

FIGS. 6a and 6b respectively show assemblies of adjacent modular units 10 arrayed to form elongated rows of cellular containers one and two chambers wide. Such configurations are particularly well suited for building caissons, levees, or other retaining or supporting structures. Note that, as indicated in FIG. 6b, once a row of cells 33 is formed by mating five units 10 together for each cell (six units for the last cell in the row) as depicted in FIG. 6a, and as delimited by the dashed line 120, an additional row of cells 35 can be added by installing only three wall units 110, 111 and 112 per cell. The last additional cell would of course also require a fourth unit. Similarly, additional rows of cells can be added in the same manner.

Figure 6C:
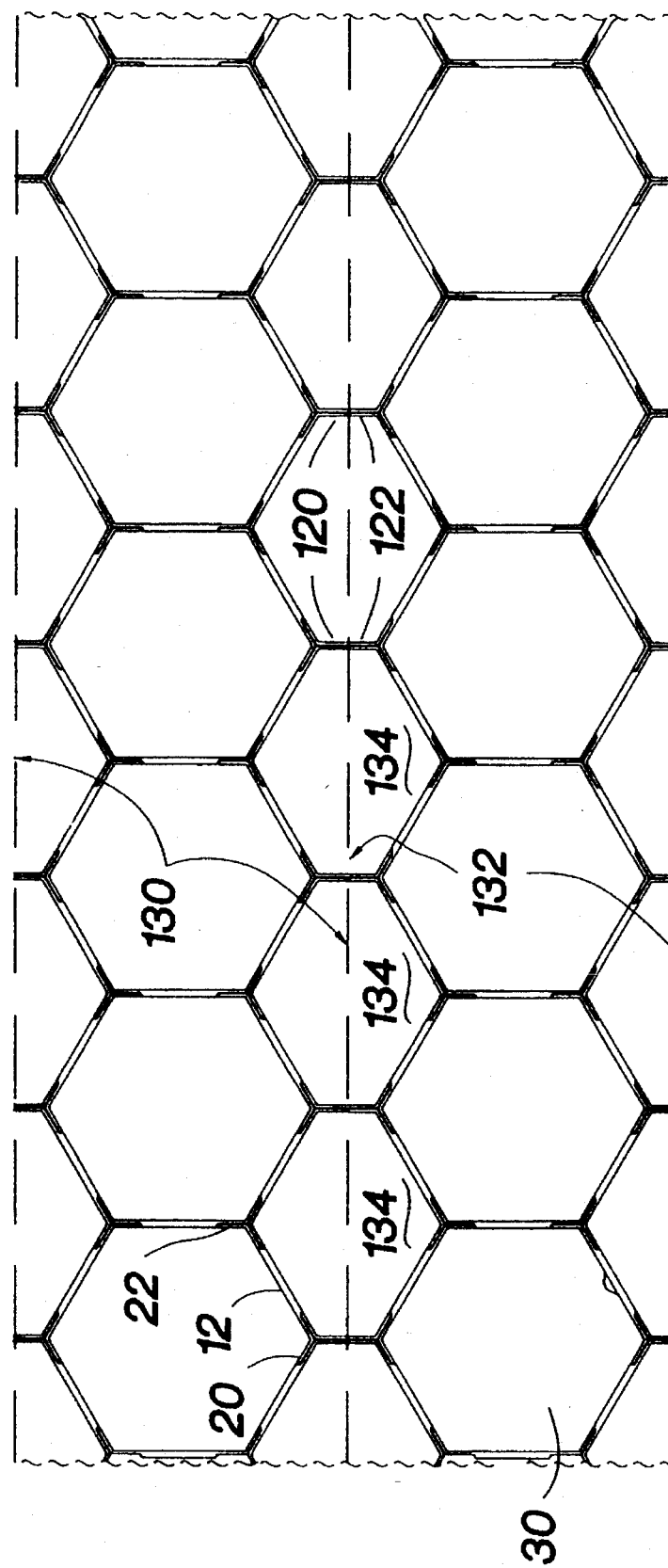
Figure 6D:
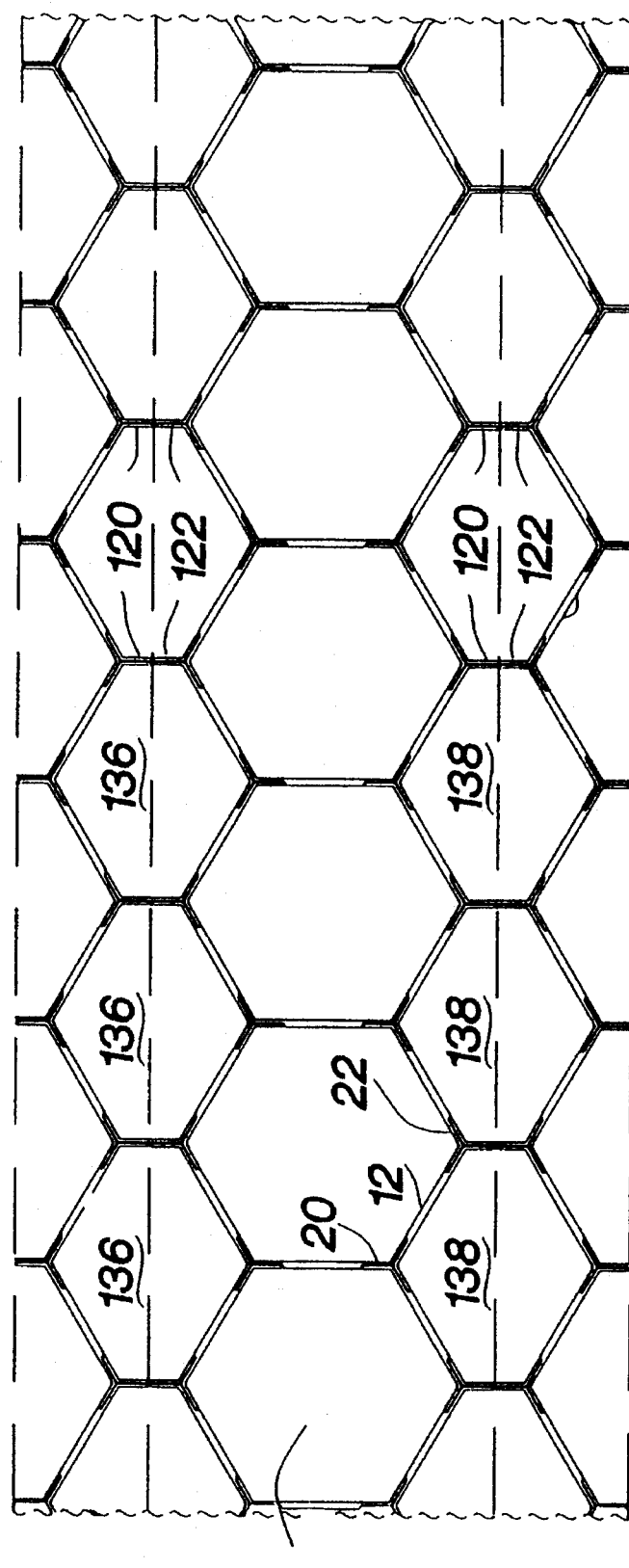

In FIGS. 6c and 6d alternative assemblies are depicted wherein irregular-shaped cells are formed by aligning and abutting the wing panels 120 and 122, and fastening them together with steel plates or other suitable means (not shown). More specifically, in FIG. 6c two rows 130 and 132 of single cell width are combined as indicated and in so doing obtain additional cells 134 at no additional wall cost. In FIG. 6d, two additional rows of cells 136 and 138 are obtained at a cost of adding only two additional wall units per cell. Although the illustrated extra cells are of reduced size, they can be expanded by using simple filler panels (not shown) that can be either precast or poured in place.

A still further alternative use of the wall units of the subject invention is illustrated in FIG. 6e. In this case a roadway sound wall or retaining wall can be assembled by bolting a series of units 140, 142, 144, etc., together as indicated using filler panels 146 to strengthen the junctions. Each junction can be fastened to separate underlying support pads (not shown) or a continuous footing can be poured.

Figure 7:
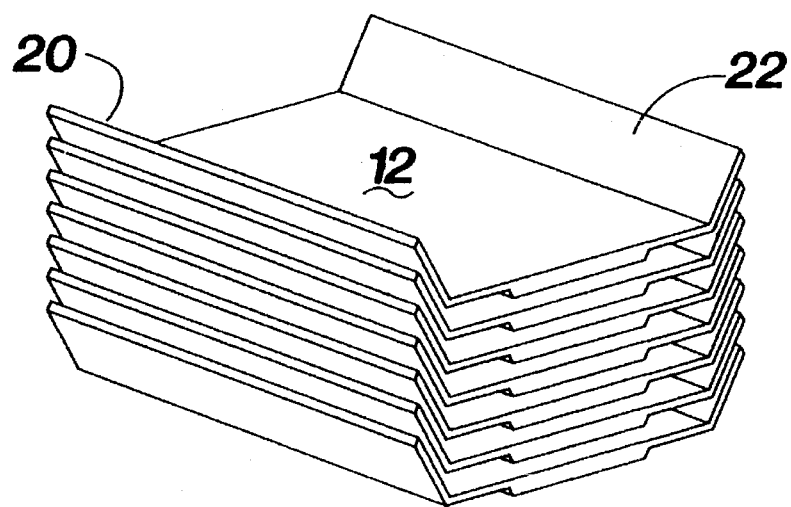
FIG. 7 depicts the nesting of several modular units for storage or shipping.

FIG. 7 suggests how a plurality of the wall units can be conveniently stacked fore storage or shipment.

Figure 8C:
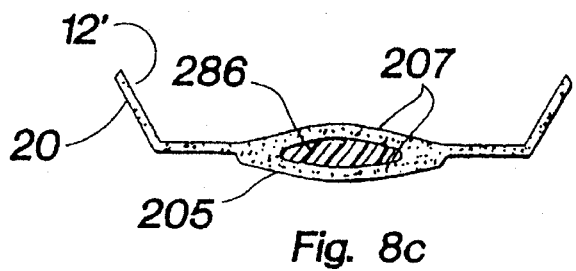
FIG. 8c illustrates an alternative configuration for the center panel the embodiment of FIG. 8b.
Figure 8A:
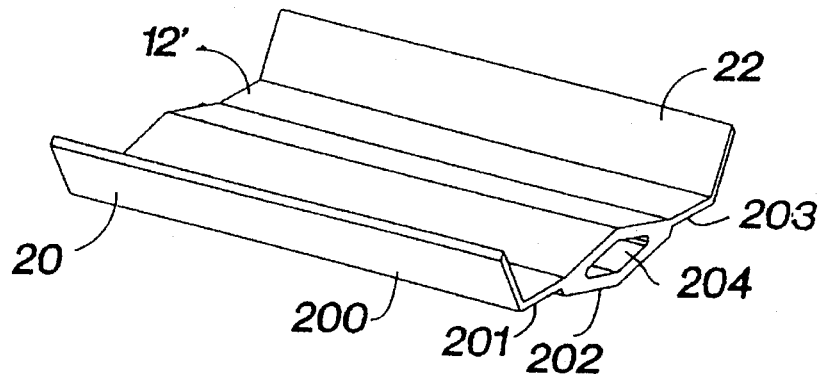
FIG. 8a illustrates an alternative configuration of a modular unit in accordance with the present invention particularly adapted for use in forming structures intended to contain liquids.
Figure 8B:
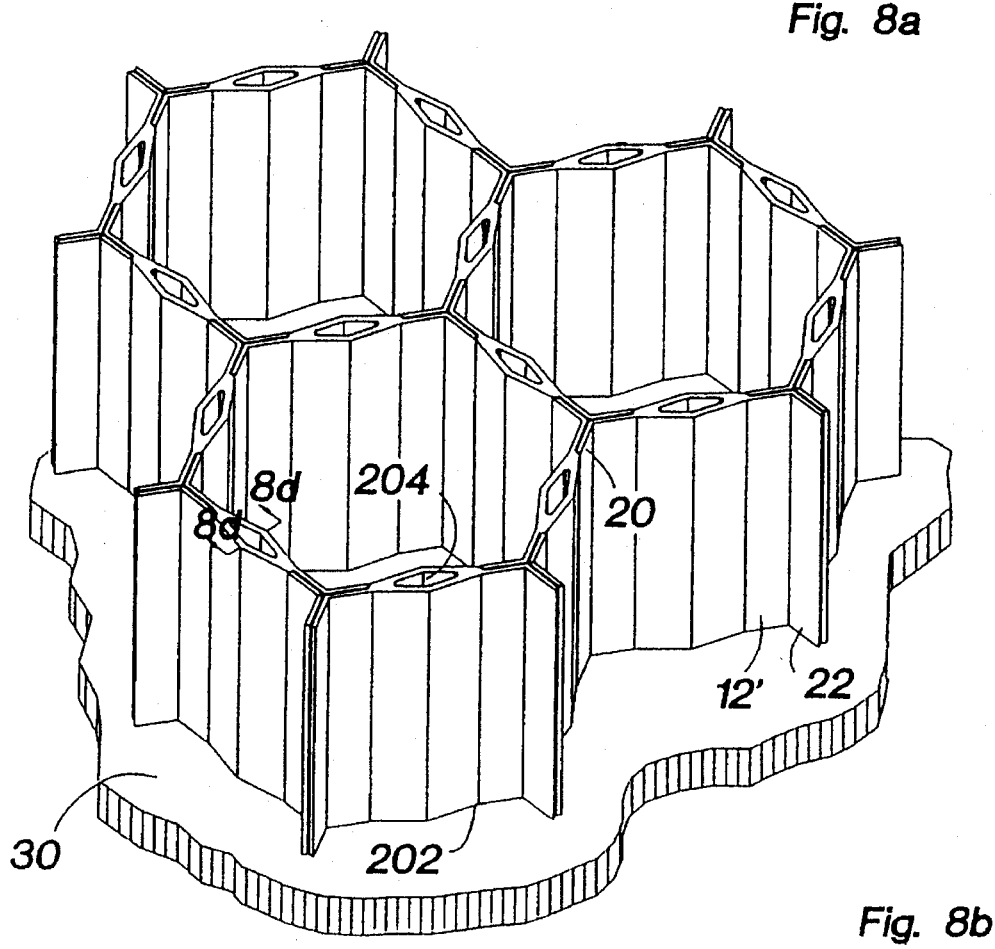
FIG. 8b is a perspective view illustrating a multi-celled container structure using the alternative embodiment depicted in FIG. 7.
Figure 8D:
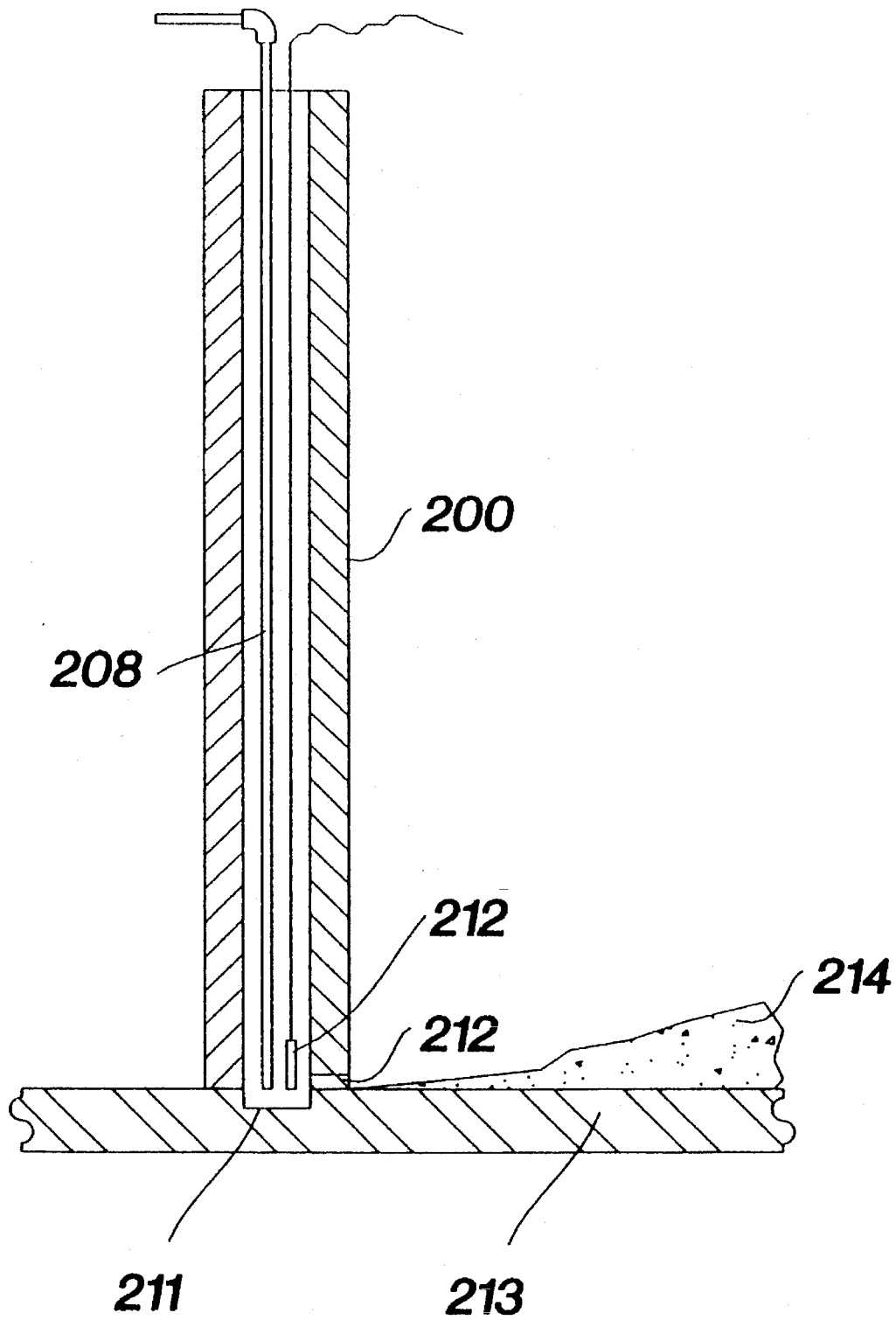
FIG. 8d is a cross-section taken along the line 9—9 of FIG. 8.

Turning now to FIG. 8a, an alternative embodiment of a wall unit 200 is depicted which is similar in all respects to the previously described wall unit, except that the central portion 202 disposed between the side portions 201 and 203 is cast with a diamond-shaped or double-bowed configuration, such that, when stood on end, a diamond-shaped vertical opening 204 is provided in each panel. Being so configured, the panels are suitable for use in constructing cellular structures such as shown in FIG. 8b for containing liquids or flowable solids which would apply lateral forces to and tend to deflect the walls outwardly. As will be appreciated by those skilled in the art, forces applied to the central portions 202 of a wall unit will tend to compress the diamond-shaped section. However, bowed wall sections will act like an arch and when loaded from the side will generate outwardly directed forces that will be resisted by inwardly directed forces emanating from each junction of the several adjacent wall units of the assembly.

A similar arching action can be obtained using a center portion or panel design such as that depicted in FIG. 8c. In this embodiment a styrofoam or other expanded plastic core 205 may be used in the vertical opening 206 to separate the arch-like webs 207 during the molding operation. The lightweight core can then either be left in place or chemically dissolved for removal.

Figure 9A:
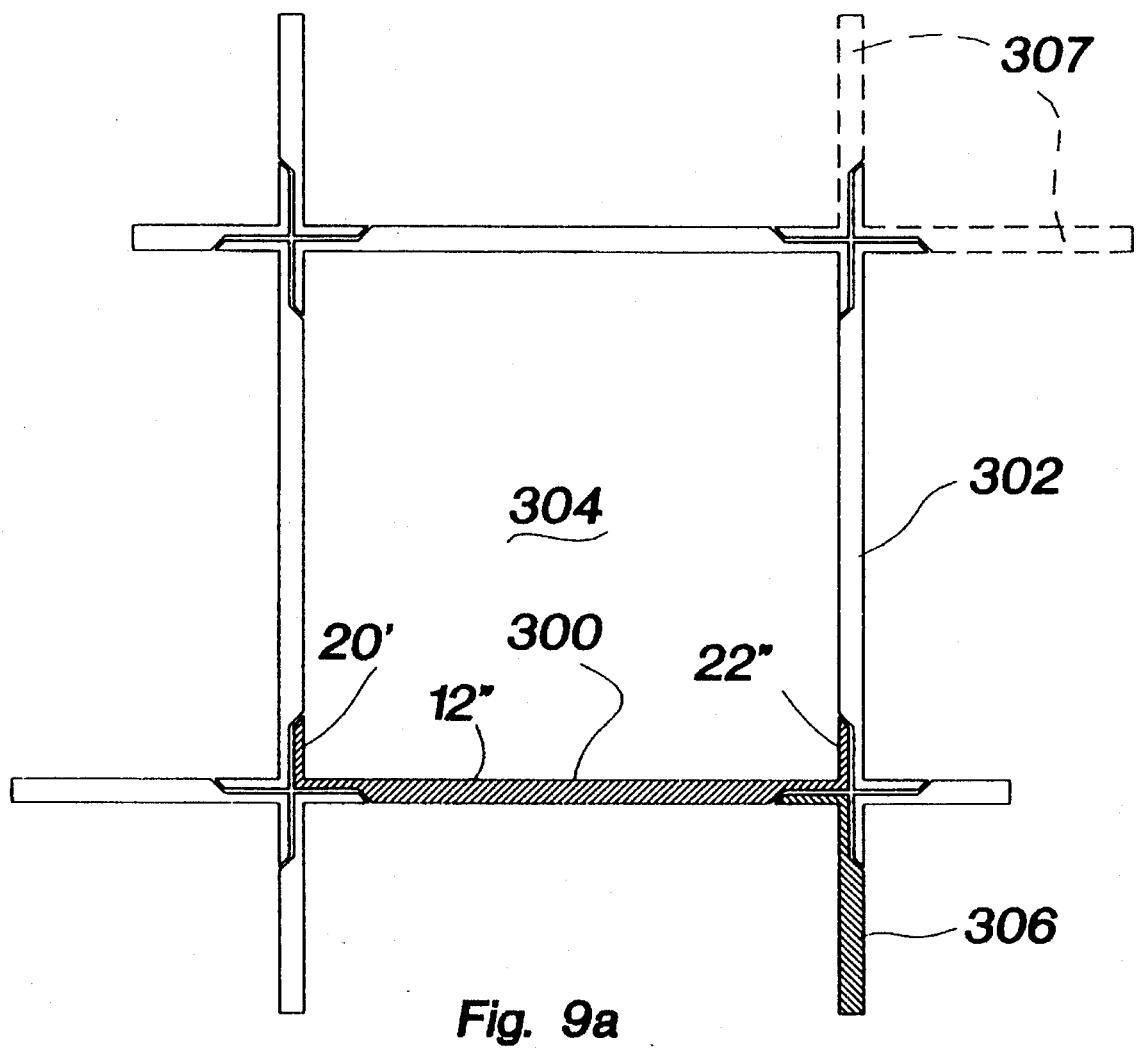
FIGS. 9a and 9b are diagrams showing alternative wing configurations for alternative panels in accordance with the present invention.

The passageway 204 can also serve as a means for accommodating plumbing, such as a sump or evacuation line 208, as shown in the cross-section of FIG. 9, or a sensor 210 for detecting the presence or perhaps the temperature of liquids passing through an opening 212 at the base of the wall unit. To accommodate passage of fluids through the opening 212 and into a sump recess 211 formed in the floor slab 213, the floor within each cell can be crowned as suggested at 214.

Figure 9B:
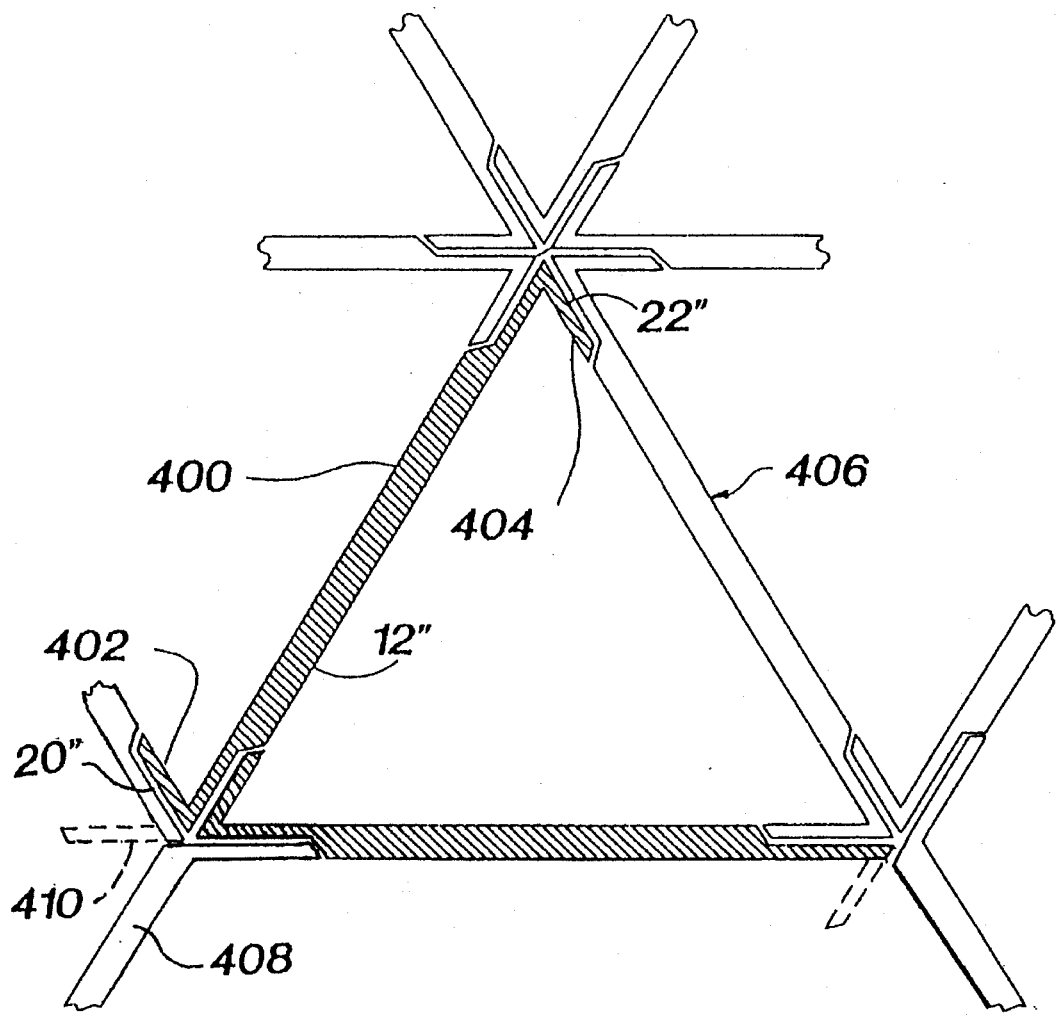

Although the previously described embodiments have all included wing-like side panels which intersect the center panels at angles of 120°, it will be appreciated that alternative configurations having side panels intersecting a central panel at other than 120° can also be provided. For example, in FIG. 9a, a 90° example is depicted wherein four identical units 300 could be mated to form a squarely configured container 302 having a square-shaped internal chamber 304. In this example a single container can be formed with filler elements 306 affixed to each corner to form buttress supports. Should one late desire to expand the system to include other cells or chambers 304, one or more of the filler elements could be removed and additional wall units could be installed as suggested by the dashed lines 307. Similarly, as depicted in FIG. 9b, three wall units 400 having side panels 402 and 404 intersecting a central panel at 60° angles could be utilized to form triangularly configured cellular structures 406. Filler elements 408 would be used at external junctions, and the side panels 410 would be sawed off. If future expansion of the system was anticipated, then the panels 410 would be left in place.

Figure 10A:
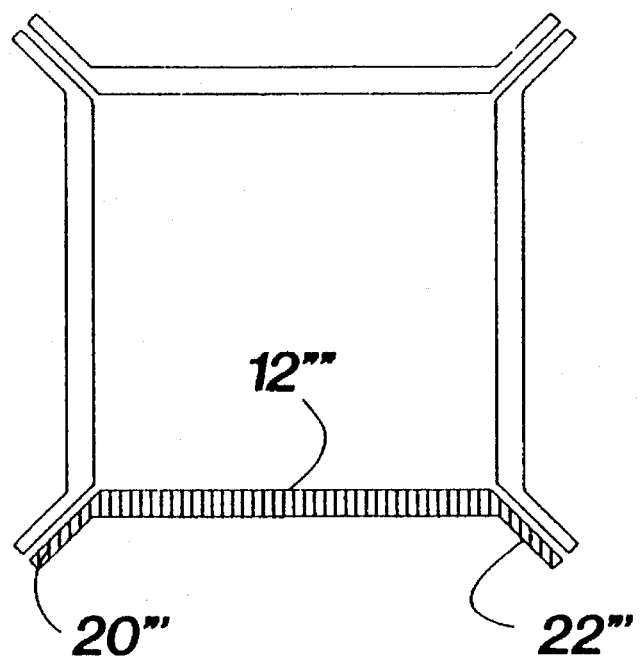
FIGS. 10a and 10b are diagrams illustrating further alternate wall unit configurations suited for single chamber construction.
Figure 10B:
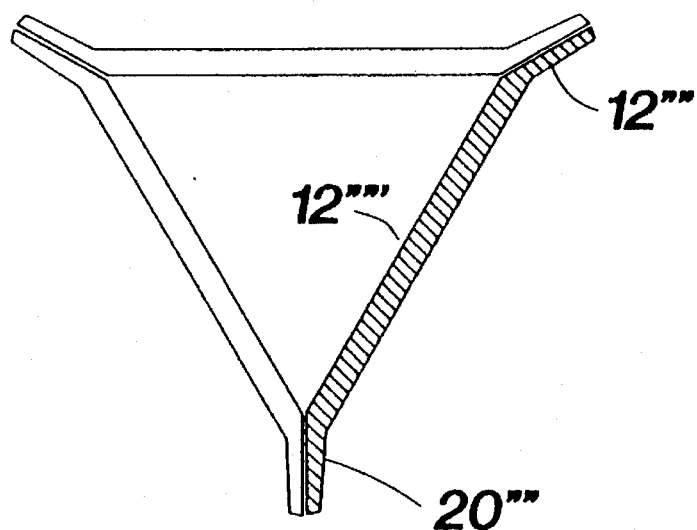

FIGS. 10a and 10b illustrate non-expandable single cell embodiments formed by fastening together wall units that are similar to those previously described except that the angles of intersection of the central panels to the side panels are different. In the embodiment of FIG. 10a the intersection angle is 135°, while in the FIG. 10b embodiment the angle is 150°. Note that in any of the embodiments of FIGS. 9a–10b the central panels may be configured as depicted in FIGS. 8a and 8c.

In FIG. 11 of the drawing a still further variation of the present invention is depicted at 500 and is generally similar to the first embodiment, except that the thickness of the central portion 502 is uniform and of a particular thickness X, and one of the side wings 504 extends in a direction opposite to that of the other side wing 506. In the illustrated example, the thickness of the side wings are approximately X/2. In this example, the planes of the wing panels 504 and 506 would intersect the plane of the center panel 502 at an angle determined by the particular application.

In FIG. 12, an application of the embodiment of FIG. 11 to form a roadway sound barrier or retaining wall is shown at 510 and includes a plurality of the units 500 aligned in series with alternating units being oriented upside-down relative to their adjacent neighbors. With such disposition, the wing walls of adjacent units will be mated and fastened together as suggested above or using any alternative means. For this application, as in that described above, a supporting foundation in the form of individual junction-supporting pads or a continuous footing could be used. It will be appreciated that in this configuration the positioning of the adjoined wing walls on alternatingly opposite sides of the wall units will provide buttresses that will resist lateral loading from either side.

In FIG. 13 a still further alternative embodiment of the present invention is depicted at 600. This wall-forming unit differs from that of the embodiment of FIG. 11 in that the central panel is of a corrugated configuration including at least five subpanels 601–605, the planes of which angularly intersect the plane of an adjacent panel at an angle of 120°, with each being intended to form one wall of a hexagonally shaped container structure. In this embodiment, the wing walls or side panels 606 and 608 extend in opposite directions relative to the subpanels, as in the embodiment of FIG. 11, and each lies in a plane which angularly intersects the plane of an adjacent subpanel at an angle of 120°. This unit, like the others disclosed above, is preferably formed of a reinforced concrete but may be made from any suitable materials.

In an alternate form of this panel, a downwardly extending rib may be included as suggested by the dashed lines 610 and typically has a width of somewhat in excess of half the width of one of the subpanels 601–605 and is notched on one side as indicated at 612.

Figure 14:
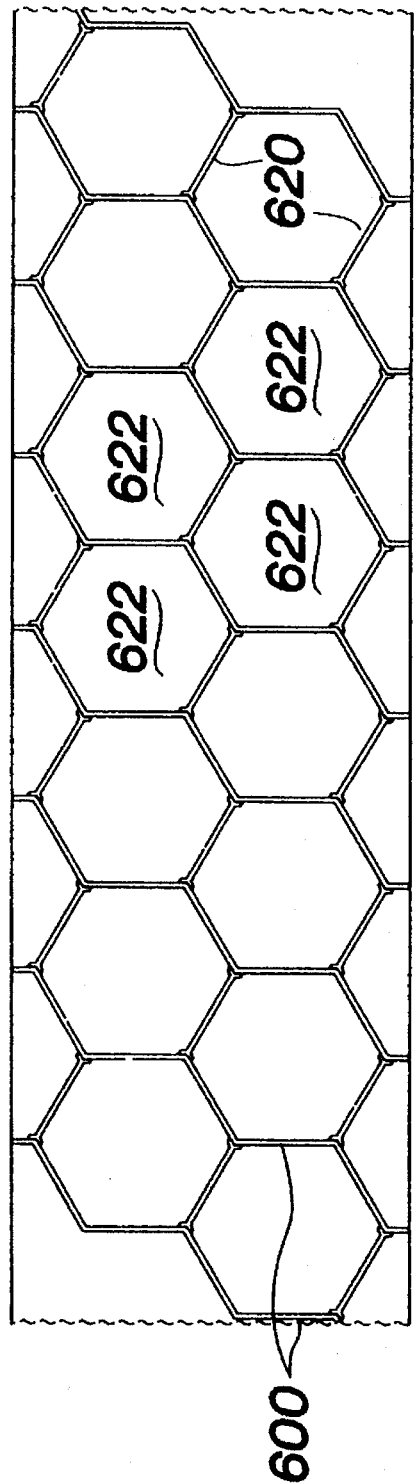
FIGS. 14 and 15 illustrate use of the modular unit of FIG. 13 to form particular types of container assemblies.

The use of the unit 600 to form a plurality of chambers is depicted in FIG. 14 in an embodiment particularly suited for an elongated rectangular array of cells of a type which might for example be placed on a flatbed truck and used to transport hazardous waste materials. In such case, a plurality of the units 600 would be disposed in parallel, spaced-apart relationship to each other and joined together by interlinking webs 620 to form a plurality of hexagonally shaped cells 622. In such case the webs 620 might be provided with tubes through which threaded bolts could be extended, after passage through openings in the wall units 600, to apply compressive joining forces to the wall junctions.

Figure 15:
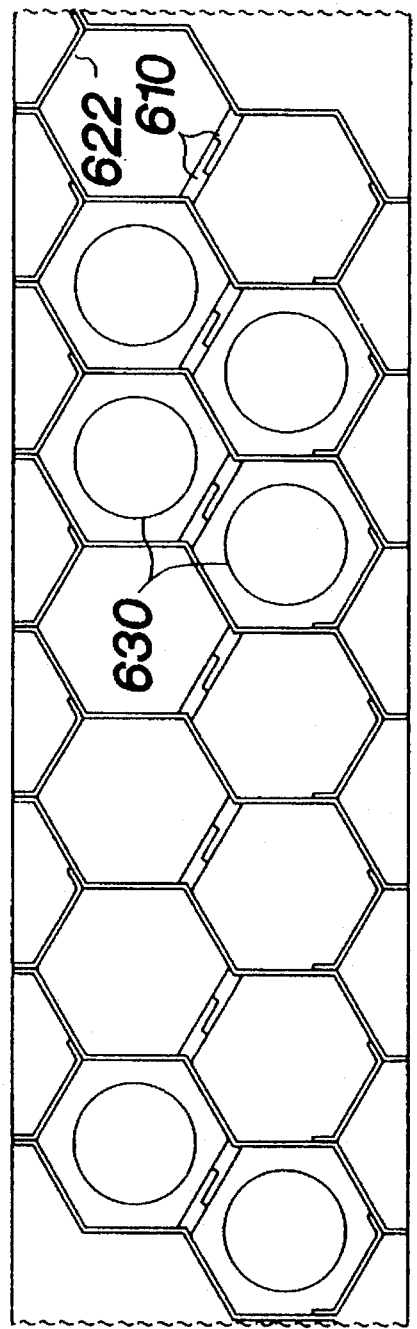

In a similar fashion, an application of the alternative embodiment of FIG. 13 including the rib 610 is depicted in FIG. 15. In such case the adjacent units 600 are mated together by linking the ribs 610 of each wall unit to like ribs of adjacent units and closing the remaining open sides using filler panels 622. As illustrated in the figure, one might utilize this embodiment as a secondary containment for barrels 630 containing hazardous wastes or other dangerous materials.

It will be appreciated by those skilled in the art that structures fabricated in accordance with the present invention can be utilized to provide secondary containment for materials stored in containers placed within the cells of the structure, or can be used to provide primary containment for any of a wide variety of uses. The units can be fabricated of any suitable materials and may be coated to accommodate particular storage or insulative requirements. Moreover, the units of the present invention may be used to form structures that can be stacked in multiple layers. In such case, the roof structure of each layer would provide both a base upon which the next layer of modular units would be assembled as well as a platform upon which installation and loading equipment could be supported. As suggested above, modular units in accordance with the present invention could also be used to build caissons for bridge abutments, marine piers, coffer dams, and many other structures for which cellular construction is appropriate.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A wall unit for use in forming a single cell or multi-cellular containment structure and comprising a generally rectangular center panel and integrally formed and rectangularly configured side panels extending from opposite side edges of said center panel and lying in planes which angularly intersect a plane including said center panel at an angle selected from the set of angles consisting of 60°, 90° and 120°, said center panel including a central portion disposed between two side portions, each said side portion being configured to mate with and be fastened to a side panel of a like wall unit, said central portion including a first web forming at least part of a first surface of said wall unit, and a second web forming at least a part of a second surface of said wall unit opposite said first surface, said first and second webs being joined at opposite extremities contiguous with said side portions and being separated at their midportions to form a cavity extending along the vertical centerline of said wall unit, said first and second webs having the characteristic that, in resisting loads applied to said inner and outer surfaces, they tend to extend the width of said center panel.

2. A wall unit as recited in claim 1 wherein the width of said central panel is W and the width of each side portion and each said side panel is less than W/2.

3. A wall unit comprising a rectangular center panel and integrally formed and rectangularly configured side panels extending from opposite sides of said center panel and lying in planes which intersect a plane including at least a part of said center panel at a predetermined angle such that a plurality of such panels may be interconnected in side-by-side relationship to form a containment structure, said center panel including a central portion disposed between two side portions, each said side portion being configured to mate with and be fastened to a side panel of a like wall unit, and each said side panel being configured to mate with and be fastened to a side portion of the like wall unit, said central portion including a first web forming at least part of a first surface of said wall unit, and a second web forming at least a part of a second surface of said wall unit opposite said first surface, said first and second webs being joined at opposite extremities contiguous with said side portion and being separated at their midportions to form a cavity extending along the vertical centerline of said wall unit, said first and second webs having the characteristic that, in resisting loads applied to said inner and outer surfaces, they tend to extend the width of said center panel.

4. A wall unit as recited in claim 3 wherein planes including said side panels intersect a plane including said center panel at an angle selected from the set of angles consisting of 60°, 90°, 120°, 135° and 150°.

5. A wall unit as recited in claim 4 wherein said side panels extend away from the plane of said center panel and away from the same face of said center panel.

6. A wall unit as recited in claim 4 wherein said side panels extend away from the plane of said center panel and away from opposite faces of said center panel.

7. A containment system comprising:

a base including a horizontal upper surface;

a plurality of interconnected wall units disposed upon said base and combining with said upper surface to form at least one containment chamber having a polygonal plan-form, each said wall unit including a rectangular center panel and integrally formed and rectangularly configured side panels extending from opposite side edges of said center panel and lying in planes which intersect a plane including at least a part of said center panel at a predetermined angle, each said center panel including a central portion disposed between two side portions, said side portions being matingly engaged to and fastened to a side panel of a like wall unit positioned adjacent thereto, said plurality of wall units being interconnected in side-by-side relationship to form a containment structure, said central portion including a first web forming at least part of a first surface of said wall unit, and a second web forming at least a part of a second surface of said wall unit opposite said first surface, said first and second webs being joined at opposite extremities contiguous with said side portions and being separated at their midportions to form a cavity extending along the vertical centerline of said wall unit, said first and second webs having the characteristic that, in resisting loads applied to said inner and outer surfaces, they tend to extend the width of said center panel.

8. A containment system as recited in claim 7 wherein planes including said side panels intersect a plane including said center panel at an angle selected from the set of angles consisting of 60°, 90°, 120°, 135° and 150°.

9. A containment system as recited in claim 8 wherein said side panels extend away from the plane of said center panel and away from the same face of said center panel.

10. A containment system as recited in claim 8 wherein said side panels extend away from the plane of said center panel and away from opposite faces of said center panel.

* * * * *